(12) United States Patent
Diab et al.

(10) Patent No.: US 8,935,542 B2
(45) Date of Patent: Jan. 13, 2015

(54) METHOD AND SYSTEM FOR A CONNECTOR WITH INTEGRATED POWER OVER ETHERNET FUNCTIONALITY

(75) Inventors: Wael William Diab, San Francisco, CA (US); Kevin Brown, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 300 days.

(21) Appl. No.: 12/752,065

(22) Filed: Mar. 31, 2010

(65) Prior Publication Data

US 2011/0217873 A1    Sep. 8, 2011

Related U.S. Application Data

(60) Provisional application No. 61/309,686, filed on Mar. 2, 2010.

(51) Int. Cl.
*G06F 1/00* (2006.01)
*H01R 13/66* (2006.01)

(52) U.S. Cl.
CPC ................................. *H01R 13/66* (2013.01)
USPC .................................... 713/300; 713/310

(58) Field of Classification Search
None
See application file for complete search history.

(56) References Cited

U.S. PATENT DOCUMENTS

| | | | |
|---|---|---|---|
| 6,856,597 B1 | 2/2005 | Scott | |
| 7,003,331 B2 | 2/2006 | Cromer | |
| 7,116,682 B1 | 10/2006 | Waclawsky | |
| 7,620,825 B2 | 11/2009 | Camagna | |
| 7,620,846 B2 | 11/2009 | Biederman | |
| 7,706,392 B2 | 4/2010 | Ghoshal et al. | |
| 2004/0073597 A1* | 4/2004 | Caveney et al. | ............... 709/200 |
| 2004/0088590 A1 | 5/2004 | Lee et al. | |
| 2006/0034295 A1 | 2/2006 | Cherukuri et al. | |
| 2006/0218422 A1* | 9/2006 | Camagna et al. | ............. 713/300 |
| 2007/0061846 A1 | 3/2007 | Gollwitzer | |

(Continued)

FOREIGN PATENT DOCUMENTS

| | | |
|---|---|---|
| EP | 1 694 023 | 8/2006 |
| WO | WO 2004/071010 | 8/2004 |

(Continued)

OTHER PUBLICATIONS

Mehrnoush et al., "A Novel Network Architecture for In-Vehicle Audio and Video Communication." Second IEEE/IFIP International Workshop on Broadband Convergence Networks, May 1, 2007.

(Continued)

*Primary Examiner* — Kim Huynh
*Assistant Examiner* — Vincent Chang
(74) *Attorney, Agent, or Firm* — Sterne, Kessler, Goldstein & Fox P.L.L.C.

(57) ABSTRACT

Aspects of a method and system for a connector with integrated power over Ethernet functionality are provided. In this regard, one or more circuits and/or processors that reside within and/or on a connector may be operable to manage a supply power that is delivered over a cable based on characteristics of the connector and/or characteristics of the cable. The cable may carry the supply power while concurrently carrying data communications. The one or more circuits and/or processors may be operable to source and sink the supply power. The one or more circuits and/or processors may be operable to control which one or more conductors of the cable are utilized for conveying the supply power.

20 Claims, 7 Drawing Sheets

(56) References Cited

U.S. PATENT DOCUMENTS

| | | | |
|---|---|---|---|
| 2007/0110360 A1 | 5/2007 | Stanford | |
| 2007/0206641 A1 | 9/2007 | Egan | |
| 2007/0219732 A1 | 9/2007 | Creus et al. | |
| 2007/0280239 A1 | 12/2007 | Lund | |
| 2008/0252307 A1* | 10/2008 | Schindler | 324/713 |
| 2008/0294917 A1* | 11/2008 | Khan et al. | 713/310 |
| 2009/0228722 A1* | 9/2009 | Lin | 713/300 |
| 2010/0100750 A1* | 4/2010 | Bobrek | 713/300 |
| 2012/0060042 A1* | 3/2012 | Buhari et al. | 713/320 |

FOREIGN PATENT DOCUMENTS

| | | |
|---|---|---|
| WO | WO 2005/071885 | 8/2005 |
| WO | WO 2006/126160 | 11/2006 |
| WO | WO 2007/012014 | 1/2007 |
| WO | WO 2007/058871 | 5/2007 |

OTHER PUBLICATIONS

Daoud et al., "Ethernet-Based Car Control Network." IEEE Canadian Conference on Electrical and Computer Engineering, May 1, 2006.

Daoud et al., "Fault-Tolerant Ethernet-Based Vehicle On-Board Networks." IECON 2006—32nd Annual Conference on IEEE Industrial Electronics, Nov. 1, 2006.

Garner et al., "IEEE 802.1 AVB and Its Application in Carrier-Grade Ethernet [Standards Topics]." IEEE Communications Magazine, vol. 45, No. 12, Dec. 1, 2007.

Kang et al., "Time Synchronization and Resource Reservation for Time-Sensitive Applications in Bridged Local Area Networks." IEEE Sixth International Conference on Advanced Language Processing and Web Information Technology, Aug. 22, 2007.

Gupta et al., "Dynamic Ethernet Link Shutdown for Energy Conservation on Ethernet Links." IEEE, Jun. 24, 2007. XP002524616.

Wael Diab, "Energy Efficient Ethernet and 802.1." Nov. 2007. XP002524617.

* cited by examiner

METHOD AND SYSTEM FOR A CONNECTOR WITH INTEGRATED POWER OVER ETHERNET FUNCTIONALITY

CROSS-REFERENCE TO RELATED APPLICATIONS/INCORPORATION BY REFERENCE

This patent application makes reference to, claims priority to and claims benefit from U.S. Patent Provisional Application Ser. No. 61/309,686 filed on Mar. 2, 2010.

This patent application also makes reference to:
U.S. Provisional Patent Application Ser. No. 61/307,246which was filed on Feb. 23, 2010;
U.S. Provisional Patent Application Ser. No. 61/309,603which was filed on Mar. 2, 2010;
U.S. Provisional Patent Application Ser. No. 61/298,076which was filed on Jan. 25, 2010;
U.S. patent application Ser. No. 12/702,173which was filed on Feb. 8, 2010;
U.S. Provisional Patent Application Ser. No. 61/288,243which was filed on Dec. 18, 2009.

Each of the above stated application is hereby incorporated herein by reference in its entirety.

FIELD OF THE INVENTION

Certain embodiments of the invention relate to networking. More specifically, certain embodiments of the invention relate to a method and system for a connector with integrated power over Ethernet functionality.

BACKGROUND OF THE INVENTION

Communication devices may incorporate a plurality of features, for example, a mobile phone, a digital camera, an Internet browser, a gaming device, a Bluetooth headphone interface and/or a location device. In this regard, the communication devices may be operable to communicate via a plurality of wire-line and/or wireless networks such as local area networks, wide area networks, wireless local area networks, cellular networks and wireless personal area networks, for example. In this regard, endpoint devices may communicate via various wireless and/or wire-line switches, routers, hubs, access points and/or base stations.

Many communication devices may communicate via twisted pair cables which may comprise pairs of copper wire that are twisted together. Various numbers of twists or turns in the wire pairs may enable mitigation of common mode electromagnetic interference. Twisted pair cabling may be shielded and/or unshielded. Shielding may comprise a conductive material that may enable grounding of the cable. A grounding wire may be also be utilized for grounding twisted pair cabling. The shielding may enclose a single pair of twisted wires and/or may enclose a plurality of pairs. The shielding may comprise foil and/or a braided sheath, for example. In this regard, the shielding may mitigate cross talk between twisted pairs and/or between a plurality of cables.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a connector with integrated power over Ethernet functionality, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a connector with integrated power over Ethernet functionality. In various embodiments of the invention, one or more circuits and/or processors that reside within and/or on a connector may be operable to manage a supply power that is delivered over a cable based on characteristics of the connector and/or characteristics of the cable. The cable may carry the supply power while concurrently carrying data communications. The one or more circuits and/or processors may be operable to source and sink the supply power. The one or more circuits and/or processors may be operable to control which one or more conductors of the cable are utilized for conveying the supply power. Exemplary characteristics of the connector may comprise which pins are present on and/or within the connector and/or a configuration of one or more circuits within and/or on the connector. Exemplary characteristics of the cable comprise a length of the cable, a diameter of one or more conductors of the cable, and whether the cable is shielded.

The connector may comprise one or more first interfaces that enable electrically coupling the connector to the cable, one or more second interfaces that enable electrically coupling the connector to a device that the connector is mounted within or on; and one or more third interfaces that enable electrically coupling the connector to another connector that is mounted on or within the device. The one or more circuits and/or processors may be operable to manage supply power provided and/or drawn via the second connector. The one or more circuits and/or processors may be controlled via a fourth interface. The one or more circuits and/or processors may be operable to manage the supply power utilizing layer two and/or 2-event power classification.

The one or more circuits and/or processors may enable the supply power and the data communications to be carried concurrently on the same one or more conductors of the cable. The one or more circuits and/or processors may be operable to communicate information to a link partner coupled to another end of the cable by varying a load and/or a voltage on one or more conductors of the cable. The one or more circuits and/or processors may be operable to detect variations in the supply power and recover information conveyed via the variations. The one or more circuits and/or processors may be operable to measure an amount of supply power delivered via the connector and perform the managing based on the measurement. The one or more circuits and/or processors may be operable to process packets to terminate one or more network management protocols.

Figure 1A:
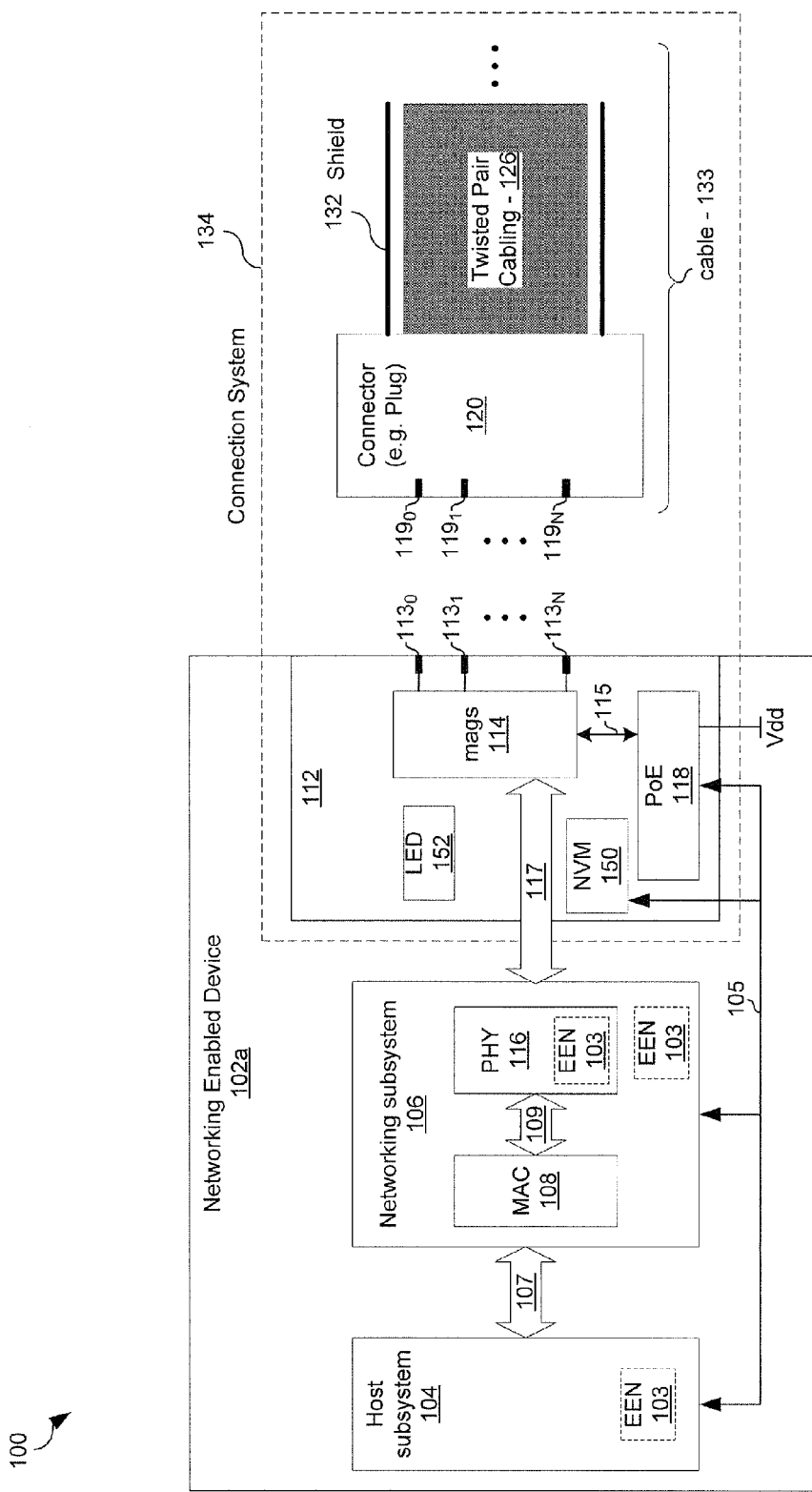
FIG. 1A is a block diagram illustrating an exemplary network device comprising a connection system with integrated power over Ethernet functionality, in accordance with an embodiment of the invention.

FIG. 1A is a block diagram illustrating an exemplary network device comprising a connection system with integrated power over Ethernet functionality, in accordance with an embodiment of the invention. Referring to FIG. 1A, there is shown a networking enabled device 102a and a connection system 134. The networking enabled device 102a may comprise a host subsystem 104, a networking subsystem 106, and a connector 112. The connection system 134 may comprise the connector 112, a cable 133, and another connector or termination (not shown) on a link partner. The cable 133 may comprise the connector 120, one or more conductors 126, and one or more connectors or other terminations (not shown) on the opposite end. Notwithstanding, a cable need not be limited to such an embodiment. For example, a cable may be as simple as a single conductor, such as a copper wire. The term "connector" is used generically herein to encompass both receptacles and plugs. In this regard, whether a connector is a receptacle that accepts a plug or whether a connector is a plug that inserts into a receptacle may be implementation dependant and unimportant in various embodiments of the invention. The connector 112 may comprise magnetics 114, a non-volatile memory (NVM) 150, one or more light emitting diodes (LEDs) 152, and a power over Ethernet (PoE) module 118. The PoE module 118 may be operable to provide or receive supply power over a cable, where supply power is typically DC power, or AC power that is converted to DC power, to power one or more electronic components. In this regard, supply power is distinguished from signal power that is delivered as part of a signaling operation.

The networking enabled device 102a may comprise suitable logic, circuitry, interfaces and/or code that may be operable to perform computing and/or networking functions. An exemplary networking enabled device 102a may comprise a router, a switch, a patch panel, a laptop, a portable phone, a media player, a location device, a television, a set-top-box, a camera and/or a gaming device. The networking enabled device 102a may be operable to communicate via the connection system 134 based on a plurality of different standardized and/or non-standardized communication protocols and/or communication technologies, for example, based on various Ethernet protocols.

The host subsystem 104 may comprise suitable logic, circuitry, interfaces, and/or code that may be operable to perform computations and/or executing instructions in the networking enabled device 102a. For example the host subsystem 104 may comprise one or more state machines and/or may run an operating system. The host subsystem 104 may perform computations and/or execute instructions to generate messages for transmission via the networking subsystem 106. The host subsystems 104 may perform computations and/or execute instructions to process messages received via the networking subsystem 106. The host subsystem 104 may interface with the networking subsystem 106 via a data bus 107 which may be, for example, a PCI-X bus. In some embodiments of the invention, the host subsystem 104 may interface with the networking subsystem 106, the NVM 150, and/or the PoE module 118 via one or more signals 105. The signals 105 may, for example, comprise one or more discrete control signals and/or one or more of the signals 105 may be communicated via a data bus such as an $I^2C$ bus or SMBus.

The networking subsystem 106 may comprise suitable logic, circuitry, interfaces, and/or code that may be operable to handle functionality of OSI layer 1 and higher OSI layers in the networking enabled device 102a, respectively. The networking subsystem 106 may be operable to implement switching, routing, and/or network interface card (NIC) functions. The networking subsystem 106 may be operable to implement Ethernet protocols, such as those based on the IEEE 802.3 standard, for example, but is not limited in this regard. The networking subsystem 106 may comprise, for example, a media access control (MAC) controller 108 and an Ethernet enabled PHY 116.

The MAC 108 may comprise suitable logic, circuitry, interfaces, and/or code that may be operable to perform data encapsulation and/or media access management, where media access management may comprise operations that handle conflicts arising from multiple networking enabled devices sharing the cable 133 and/or from multiple applications, processes, or virtual machines within the networking enabled device 102a sharing the connection system 134. In this regard, each MAC 108 may provide an interface between the PHY 116 and the host subsystem 104. Each MAC 108 may communicate with the host subsystem 104 via the bus 107 and may communicate with the PHY 116 via the data bus 109, which may comprise a media independent interface (xxMII). In this regard, "media independent interface (xxMII)" is utilized generically herein and may refer to a variety of interfaces including, but not limited to, a media independent interface (MII), a gigabit MII (GMII), a reduced MII (RMII), reduced gigabit MII (RGMII), and 10 gigabit MII (XGMII). The xxMII may comprise a carrier sense signal (CRS) which may be utilized to manage a rate at which data is communicated between the PHY 116 and the MAC 108.

The PHY 116 may comprise, for example, a twisted pair Ethernet PHY capable of operating at a variable data rate. In this regard, each PHY 116 may be operable to adjust a data rate at which it communicates based on characteristics of the connection system 134 via which it communicates. The PHY 116 may, for example, enable multi-rate Ethernet communications. For example, the PHY 116 may be operable to communicate at any of 10 Mbps, 100 Mbps, 1 Gbps, 2.5 Gbps, 4 Gbps, 8 Gbps, 10 Gbps, 40 Gbps and 100 Gbps. In this regard, the networking subsystem 106 may support standard-based data rates and/or non-standard data rates. The PHY 116 may be operable to achieve various data rates via configuration of various parameters. Exemplary parameters that may be configured in the PHY 116 to control the data rate may comprise the number of channels of the cabling over which the PHY 116 communicates, the symbol rate at which the PHY 116 operates, the encoding or modulation scheme utilized by the PHY 116, the inter-frame gap time, and buffer sizes or thresholds. The PHY 116 may be configured based on characteristics of the connection system 134 over which it communicates.

In an exemplary embodiment of the invention, the PHY 116 may be, for example, configured based on the quantity and/or types of pins on the connector 112 and/or the connector 120. For example, in some implementations or use cases, the connector 112 and/or the connector 120 may comprise more pins for interfacing to more twisted pairs and in some instances it may have fewer pins for interfacing with fewer twisted pairs. The type of pins may refer to, for example, the material the pins are made of, e.g., gold, copper, aluminum, or tin. The type of pins may refer to the function of the pins. For example, in some instances the connector 112 and/or the connector 120 may comprise sense pins or other pins that indicate a configuration of the connector 112 and/or the connector 120. Similarly, the PHY 116 may be configured based on a voltage and/or currents on one or more pins of the connector 112 and/or the connector 120.

In an exemplary embodiment of the invention, the PHY 116 may be, for example, configured based on circuits and/or components populated on and/or within the connector 112 and/or the connector 120. In this regard, depending on the implementation or use case, various components, such as the magnetics 114, the LED 152, the NVM 150, and the PoE module 118 may or may not be populated within and/or on the connector 112 and/or the connector 120. Similarly, the PHY 116 may be, for example, configured based on a configuration and/or operation of such components within and/or on the connector 112 and/or the connector 120.

In an exemplary embodiment of the invention, the PHY 116 may be, for example, configured based on a length of the cable 133, a diameter of the conductors of which the cable is comprised, and/or whether the shield 132 is present. Characteristics of the connection system 134 may, in some instances, be determined utilizing time domain reflectometry and/or other techniques.

In an exemplary embodiment of the invention, the PHY 116 may be configured based on the traffic that it handles. For example, if traffic is heavier in one direction than in the other direction, the PHY 116 may be configured to operate in an asymmetrical mode where outbound data and inbound data may be communicated at different rates. Similarly, the rate at which the PHY 116 communicates and the number of channels over which the PHY 116 communicates may be determined based on characteristics of the connection system 134. For example, the PHY 116 may be operable to communicate at higher rates and/or via more channels when coupled to shorter and/or larger diameter cabling, and communicate at lower rates and/or via fewer channels when coupled to longer and/or smaller diameter cabling.

The connection system 134 may be operable to support communication based on a plurality of standardized and/or non-standardized communication protocols and/or technologies. In various embodiments of the invention, the connection system 134 may comprise a shield 132. The connector 112 may be operable to couple to cables comprising various features. For example, cables of various lengths, cables with or without shielding, and/or cables comprising various categories of cabling, such as cat 3, 5, 5e, 6, 6a, 7, or 7a, may be coupled to the connector 112. Moreover, various components of the connection system 134 may comply with one or more structured cabling standards, for example, ISO/IEC and/or TIA standards. When the connector 120 is coupled to the connector 112, the networking enabled device 102a may be operable to determine characteristics of the connection system 134, including, but not limited to, whether the cable 133 comprises a shield. In this regard, one or more of the connector 120, the network subsystem 106, and/or the host subsystem 104 may, autonomously or cooperatively, determine the characteristics of the connector 120, the connector 112, the conductor(s) 126, and/or shielding 132. The characteristics may, as described above, be utilized to determine a data rate at which to communicate via the connection system 134 and/or determine how to allocate or otherwise manage supply power provided via the connection system 134.

The connection system 134 may comply with standardized and/or non-standard specifications. For example, the connector 112 and the connector 120 may be compatible with Ethernet standards and may be small enough to fit into a handheld device and/or small enough to enable greater than 48 receptacles and/or plugs to fit into a one rack unit face plate of a 19-rack rack. Furthermore, in various embodiments of the invention, the connection system 134 may comprise a plurality of connectors such as the connector 112 that may be coupled or "ganged" together.

The connector 112 may be coupled to the connector 120 for communication of data and delivery of supply power over the cable 133. For example, the connector 120 may be inserted into the connector 112 and may be held in place via either friction retention and/or via a positive retention mechanism such as a latch or screw. The connector 112 may be configurable or may be dedicated for a specific function. For example, the connector 112 may be a service port that may enable management of the communication device 102a. In another exemplary embodiment of the invention, the connector 112 may be utilized for data communication. Furthermore, the connector 112 may be configurable for wireless communication. For example, the connector 112 may function as an antenna port. The connector 112 may be multifunctional where a plurality of types of communication may operate concurrently. In various embodiments of the invention, the connector may be keyed or comprise some other mechanical means for ensuring the connector 120 is inserted correctly and/or to ensure that only compatible connectors may be inserted into the connector 112.

In various embodiments of the invention, the networking enabled device 102a may be operable to implement one or more energy efficient networking techniques, which may be referred to as energy efficient networking (EEN) or, in the specific case of Ethernet, energy efficient Ethernet (EEE). For example, the networking enabled device 102a may be operable to support low power idle (LPI) and/or sub-rating, also referred to as subset PHY, techniques. Low power idle may generally refer a family of techniques where, instead of transmitting conventional IDLE symbols during periods of inactivity, the PHY devices 110a and 110b may remain silent and/or communicate signals other than conventional IDLE symbols. Sub-rating, or sub-set PHY, may generally refer to a family of techniques where the PHYs are reconfigurable, in real-time or near real-time, to communicate at different data rates.

Utilizing one or more EEN techniques such as sub-rating and LPI, the networking enabled device 102a may be configured to operate in various modes of operation in which power consumption of the networking enabled device 102a may vary based on the mode of operation. In this regard, an EEN control policy may determine how to configure and/or reconfigure various portions of the networking enabled device 102a to optimize the tradeoff between energy efficiency and performance. For LPI, for example, the EEN control policy may determine what variant of LPI to utilize, when to go into an LPI mode, and when to come out of an LPI mode. For subset PHY, for example, the EEN control policy may determine how to achieve a desired data rate and when to transition between data rates. The energy efficient techniques and/or the EEN control policy may be implemented via logic, circuitry, interfaces, and/or code that may be implemented in one or both of the host subsystem 104 and the networking subsystem 106, as indicated by blocks 103.

The connector 120 may be coupled to the connector 112 and/or the optional shield 132. Upon mating of the connector 120 to the connector 112, the pins $119_0$-$119_N$ may be in conductive contact with the pins $113_0$-$113_N$, respectively. In various embodiments of the invention, the connector 120 may comprise suitable logic, circuitry, interfaces and/or code that may be operable to communicate based on IEEE 802.3 standards and/or extensions and/or variations thereof. Which one or more of the pins $119_0$-$119_N$ and/or which one or more of the pins $113_0$-$113_N$ may depend on the implementation or use case. Additionally, the material from which the pins $119_0$-$119_N$ and/or the pins $113_0$-$113_N$ are made may depend on the implementation or the use case.

The conductor(s) 126 may comprise, for example, insulated twisted pairs of aluminum or copper. Characteristics of the conductor(s) 126, such as number of twisted pairs within the cable 133, presence of shielding 132, length of the cable 133, and/or wire gauge used for the twisted pairs may determine which protocols and/or which data rates the cable 133 may be operable to support. The optional shield 132 may comprise, for example, foil and/or a braided sheath around and/or along a length of one or more twisted pairs. For example, one or more individual twisted pairs may be shielded via one or more corresponding shields 132, and/or a plurality of twisted pairs may be encased in a single shield 132. The optional shield 132 may be grounded by the networking enabled device 102a via the connector 112, for example.

The NVM 150 may comprise, for example, a programmable ROM which may store information about the connector 112. In this regard, the host subsystem 104 and/or the networking subsystem 106 may be operable to read the contents of the NVM 150 to determine characteristics of the connector 112. For example, the contents of the NVM 150 may indicate whether the PoE module 118 is present in the connector 112 and capabilities of the PoE module 118, such as the amount of supply power it may provide and/or manage, the granularity with which the supply power may be adjusted, the protocols and/or methods it utilizes for classifying power needs.

The LED(s) 150 may be operable to indicate characteristics and/or status of the connection system 134. For example, the LED(s) 150 may indicate whether the connector 112 and 120 are properly mated, whether the shield 134 is present, whether data is being communicated over the cable 133, a length of the cable 133, whether the opposite end of the cable 133 is mated with a networking enabled device, whether the PoE module 118 is present and/or enabled, and/or other configuration information associated with the PoE module 118. Such other Information associated with the PoE module 118 which may be indicated by the LED(s) may comprise, for example, whether the PoE module 118 is configured into PSE or PD mode, whether the PoE module 118 is supplying power or receiving power via the cable 133, how many twisted pairs are being utilized to provide and/or draw power, and/or a class of power being delivered and/or received.

The magnetics 114 may comprise suitable logic, circuitry, interfaces, and/or code that may be operable to couple the signal bus 117 to pins 113 of the connector 112. In this regard, the magnetics 114 may provide noise and/or EMI suppression and/or may impedance match the signal bus 117 to the connector 120 and the conductor(s) 126. In this regard, the magnetics 114 may comprise one or more transformers and/or one or more inductive chokes. In some instances, the magnetics 114 may also comprise other components such as resistors, capacitors, and/or inductors for achieving impedance matching, isolation, and/or noise and/or EMI suppression. In various embodiments of the invention, the magnetics 114, or portions thereof, may be absent from the connector 112. That is, the connector 112 may be of a modular design and whether the magnetics 114, or portions thereof, are populated may depend on, for example, the noise that the networking device 102a is expected to tolerate, the length of the cable 133 over which the networking device 102a will be expected to communicate, and/or whether the networking subsystem 102a will be tied to a fixed potential, e.g., "grounded," or whether it will be "floating." In this manner, by populating or not populating the magnetics 114, or portions thereof, different variants of the connector 112 may be manufactured for different use cases.

The PoE module 118 may comprise suitable logic, circuitry, interfaces, and/or code operable to condition, regulate, and/or otherwise manage or control supply power available and/or drawn via the connection system 134. The PoE module 118 may be coupled to one or more power rails (labeled "Vdd"). The PoE module 118 may be configured utilizing one or more parameters. In this regard, exemplary configurable parameters for the PoE module 118 comprise one or more resistances, capacitances, and/or inductances; a switching frequency of a DC-DC converter in the PoE module 118; an output current and/or a voltage when operating as a PSE; a current drawn by the PoE when operating as a PD; the number of twisted pairs over which power is sourced or sunk; and which wires are utilized for sourcing and/or sinking supply power. In various embodiments of the invention, the PoE module 118 may be absent from the connector 112. That is, the connector 112 may be of a modular design and whether the PoE module 118 is populated may depend on, for example, whether the networking device 102a will be expected to support PoE. In this manner, by populating or not populating the PoE module 118 different variants of the connector 112 may be manufactured for different use cases. The PoE module 118 may be configured based on characteristics of the connection system 134.

In an exemplary embodiment of the invention, the PoE module 118 may be, for example, configured based on the quantity and/or types of pins on the connector 112 and/or the connector 120. For example, in some implementations or use cases, the connector 112 and/or the connector 120 may comprise more pins for interfacing to more twisted pairs and in some instances it may have fewer pins for interfacing with fewer twisted pairs. The type of pins may refer to, for example, the material the pins are made of, e.g., gold, copper, aluminum, or tin. The type of pins may refer to the function of the pins. For example, in some instances the connector 112 and/or the connector 120 may comprise sense pins or other pins that indicate a configuration of the connector 112 and/or the connector 120. Similarly, the PHY 116 may be configured based on a voltage and/or currents on one or more pins of the connector 112 and/or the connector 120.

In an exemplary embodiment of the invention, the PoE module 118 may be, for example, configured based on circuits and/or components populated on and/or within the connector 112 and/or the connector 120. In this regard, depending on the implementation or use case, various components, such as the PHY 116, the magnetics 114, the LED 152, and the NVM 150 may or may not be populated within and/or on the connector 112 and/or the connector 120. Similarly, the PoE module 118 may be, for example, configured based on a configuration and/or operation of such components within and/or on the connector 112 and/or the connector 120.

In an exemplary embodiment of the invention, the PoE module 188 may be, for example, configured based on a length of the cable 133, a diameter of the conductors of which the cable is comprised, and/or whether the shield 132 is present. Characteristics of the connection system 134 may, in some instances, be determined utilizing time domain reflectometry and/or other techniques.

In some embodiments of the invention, the PoE module 118 may adhere to power over Ethernet standards IEEE 802.3af and/or IEEE 802.3at. In other embodiments of the invention, supply power available and/or drawn via the connection system 134 may not be as established in IEEE 802.3 standards and/or extensions and/or variations thereof. For example, American passenger vehicles typically have a native 12 Vdc power system generated by one or more batteries and/or alternators. Accordingly, the PoE module 118 may be operable to condition, regulate, and/or otherwise manage or control distribution of supply power from the 12 Vdc power system via the connection system 134 and/or for receiving supply power from the 12 Vdc power system via the connection system.

In instances that the networking enabled device 102a operates as a power supplying equipment (PSE), various logic, circuitry, interfaces, and/or code of the PoE module 118 may be operable to provide supply power via the connection system 134. Furthermore, the PoE module 118 may be operable to condition, regulate, and/or otherwise manage or control supply power available via the connection system 134. In this regard, supply power available from the PoE module 118 may be conditioned, regulated, or otherwise managed or controlled based on various indications and/or conditions. In some embodiments of the invention, a value of a sense resistor in a link partner may be detected to determine how to control condition, regulate, and/or otherwise manage or control supply power available and/or provided via the connection system 134. In some embodiments of the invention, power classification techniques similar to or the same as those being developed by the IEEE 802.3 at task force—2-Event classification and/or Layer 2 Classification, for example—may be utilized to determine how to control condition, regulate, and/or otherwise manage or control supply power available and/or provided via the connection system 134. In some embodiments of the invention, characteristics of the connection system 134 may be utilized to determine how to condition, regulate, or otherwise manage or control supply power available and/or provided via the connection system 134. For example, the number of twisted pairs in the cable 133 and/or the presence of the shielding 132 may determine how much current may be delivered via the connection system 134. Additionally or alternatively, the determination of how to condition, regulate, and/or otherwise manage or control the supply power available and/or provided via the connection system 134 may be based on an energy management policy implemented in the networking enabled device 102a.

In instances that the networking enabled device 102a operates as a powered device (PD), logic, circuitry, interfaces, and/or code of the PoE module 118 may be operable to draw supply power from a link partner via the connection system 134. In this manner, at least a portion of the networking enabled device 102a may operate using supply power drawn via the connection system 134. In some embodiments of the invention, the PoE module 118 may be enabled to indicate a supply power desired and/or required via a variable sense resistor which may be configured, via the signals 105. In some embodiments of the invention, power classification techniques similar to or the same as those being developed by the IEEE 802.3 at task force—2-Event classification and/or Layer 2 Classification, for example—may be utilized to indicate supply power desired and/or required. In some embodiments of the invention, characteristics of the connection system 134 may be utilized to determine how much power is desired and/or required. Also, in instances that the networking enabled device 102b is operating in PD mode, the PoE module 118 may be operable to condition, regulate, or otherwise manage or control supply power drawn via the connection system 134.

In various embodiments of the invention, the PoE module 118 may be configured based on the EEN control policy. In this regard, the supply power available and/or drawn via the connection system 134 may determine a mode of operation of the networking enabled device 102a. For example, in instances that less supply power is available via the connection system 134, the networking enabled device 102a may be configured to operate in a low power mode. Additionally or alternatively, a mode of operation of the networking enabled device 102a may determine supply power drawn and/or supplied via the connection system 134. For example, in instances that the networking enabled device 102a is configured to operate in a low power mode, the PoE module 118 may be configured to draw less supply power from a link partner that is operating as a PD.

In various embodiments of the invention, the amount of supply power delivered and/or drawn via the connection system 134 may be controlled by, for example, by controlling the number of twisted pairs of the cable 133 that are utilized for providing or drawing power. In various embodiments of the invention, the PoE module 118 may be operable to measure supply power provided and/or drawn and such measurements may be utilized to manage the supply power.

In some embodiments of the invention, the PoE module 118 may be operable to function independently of the networking subsystem 106 and/or the host subsystem 104. Accordingly, PoE functionality may be added to a device such as the networking enabled device 102a by replacing a non-PoE connector with the connector 112. In this regard, replacement of a non-PoE connector with the connector 112 may require little modification and/or retro-fitting. For example, the connector 112, or a plurality of coupled or "ganged" connectors 112, may have the same solder land pattern as a non-PoE connector, such as an RJ-45 connector, and a power rail may be connected to the connector via a single jumper wire. For example, an RJ-45 connector may be replaced by a plurality of connectors 112 with one of the connectors 112 being operable to provide data communications and supply power and the remaining connectors 112 being operable to provide supply power but not data communications.

Figure 1B:
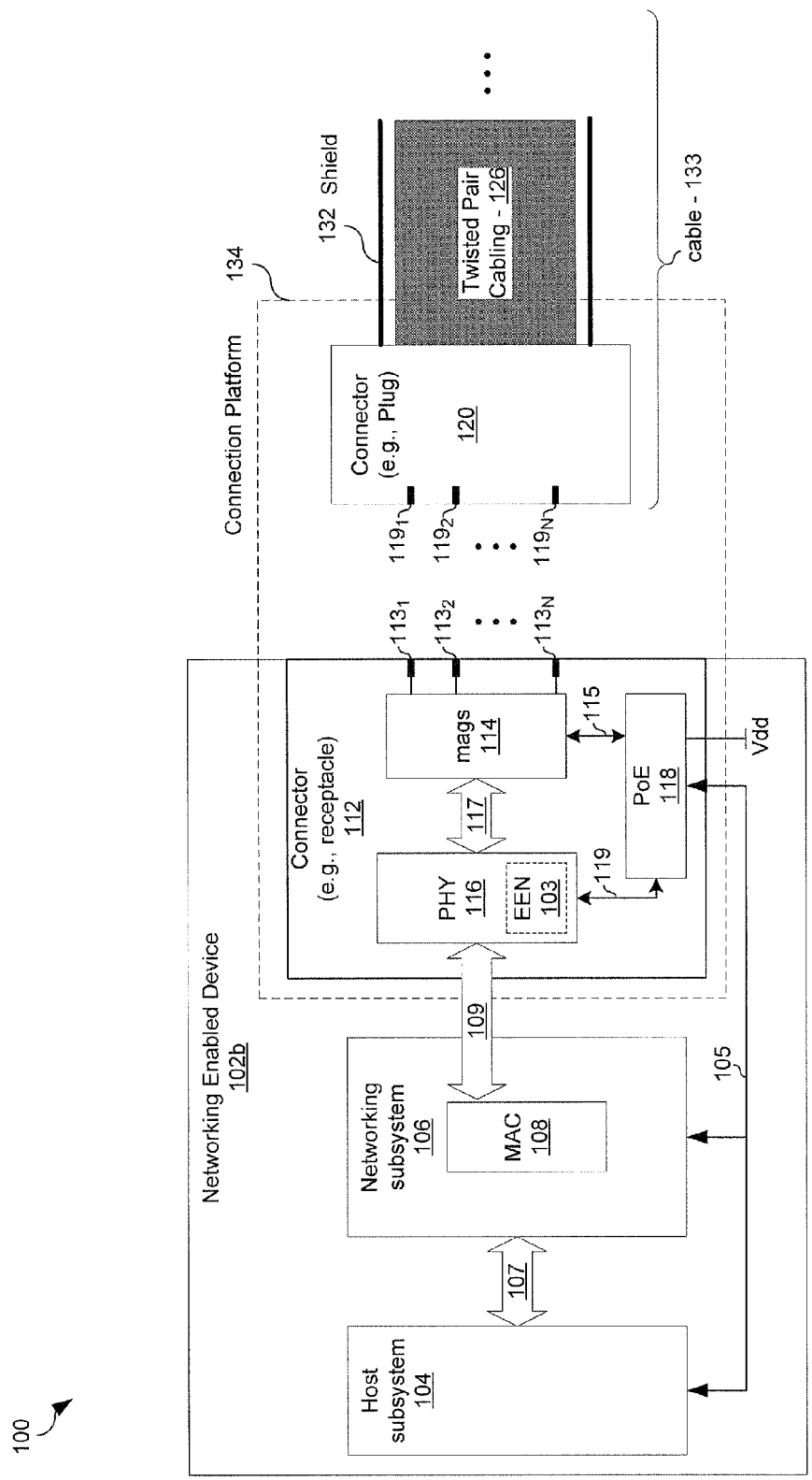
FIG. 1B is a block diagram illustrating another exemplary network device comprising a connection system with integrated power over Ethernet functionality, in accordance with an embodiment of the invention.

FIG. 1B is a block diagram illustrating another exemplary network device comprising a connection system with integrated power over Ethernet functionality, in accordance with an embodiment of the invention. In this regard, FIG. 1B illustrates an alternate embodiment of the network device 102 and connector 112 in which the PHY 116 is integrated into the connector 112. The networking enabled device 102b may be substantially similar and/or operate substantially similarly to the networking enabled device 102a of FIG. 1A.

In the embodiment of the invention depicted in FIG. 1B, the connector 112 comprises the PHY 116. In such instances, the PHY 116 may be operable to determine characteristics of the connection system 134 and may be operable to configure the PoE module 118 based on the characteristics. Additionally and/or alternatively, the PHY 116 may be operable to communicate and/or negotiate with a link partner via the connection system 134 and may configure the PoE module 118 based on the communications and/or negotiations.

In other embodiments of the invention, the MAC 108, or MAC functions, may be integrated in the connector 112. Accordingly, the MAC or MAC functions in the connector 112 may handle media access and thus multiple connectors, each enabled to communicate data, may replace a single legacy connector. That is, multiple connectors 112 may fit into the solder land pattern of the legacy connector and the number of ports on the networking device 102b may be increased by replacing the single legacy connector with a plurality of connectors 112.

In various embodiments of the invention, suitable logic, circuitry, interfaces, and/or code operable to implement one or more network management protocols such as simple network management protocol (SNMP), link layer discovery protocol (LLDP), and data center bridging exchange (DCBX) may reside on and/or within the connector 112. In this regard, packets in accordance with one or more network management protocols may be generated and/or parsed or deconstructed in the connector 112. That is, one or more network management protocols may be terminated in the connector 112. In this manner, various components of the connector 112 and/or other portions of the networking enabled device 102a may be configured and/or otherwise managed based on management information received over a network. For example, one or more LLDP packets may be received and processed in the connector 112 and the PoE module 118, for example, may be configured based on information received in the LLDP packet(s). Similarly, information recovered from one or more LLDP packet may be conveyed to the host subsystem 104 and/or the networking subsystem 106 via the bus 105 and/or the bus 109.

Figure 2A:
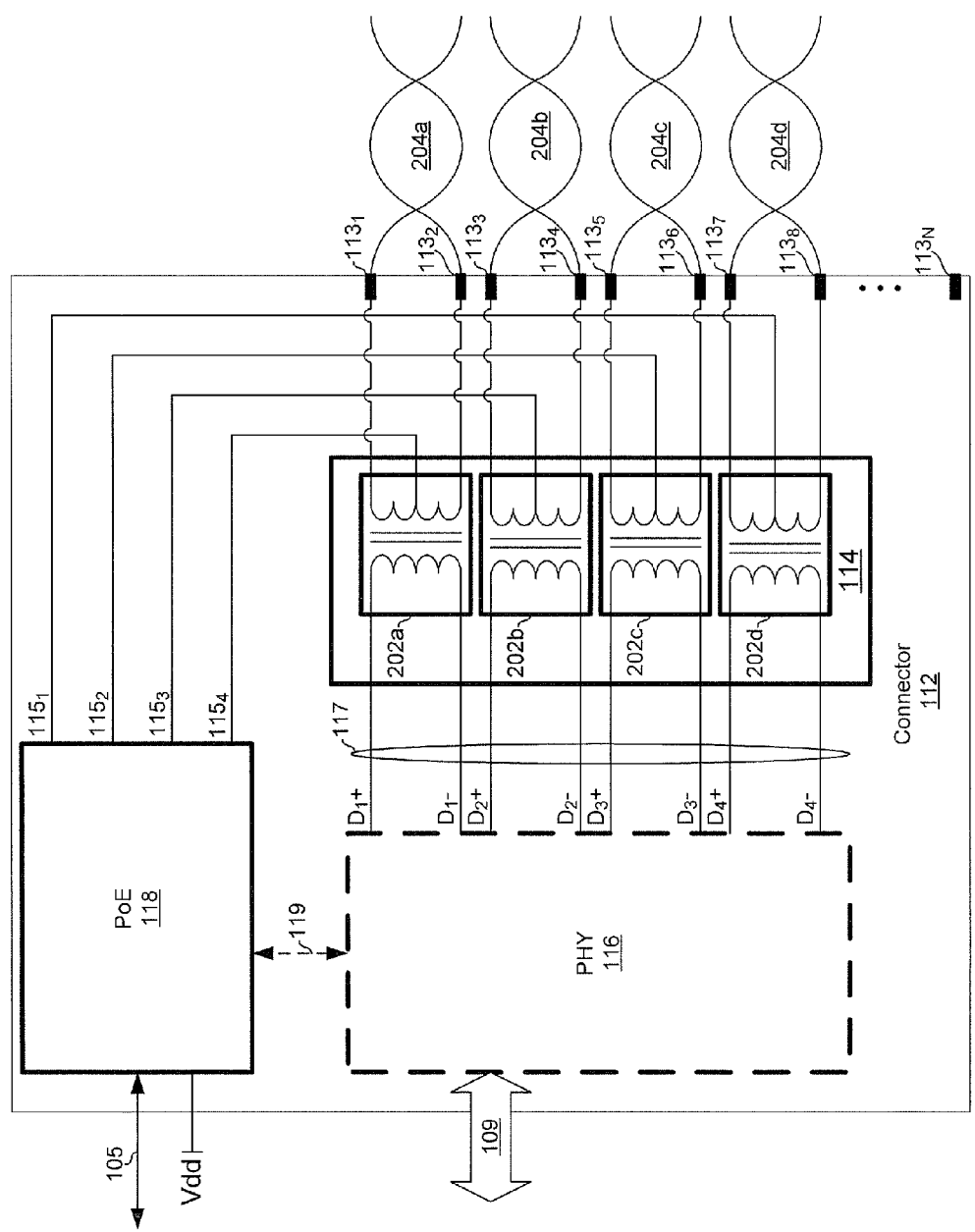
FIG. 2A is a block diagram illustrating an exemplary connector with integrated PoE functionality, in accordance with an embodiment of the invention.

FIG. 2A is a block diagram illustrating an exemplary connector with integrated PoE functionality, in accordance with an embodiment of the invention. Referring to FIG. 2A, there is shown the connector 112 comprising the PoE module 118, the magnetics 114, and optionally comprising the PHY 116. In this regard, the connector 112 may be substantially similar and/or may operate in a substantially similar manner as is described with respect to FIGS. 1A and/or 1B.

In instances that the PoE module 118 is operating in PSE mode, the PoE module 118 may provide supply power via the power rails $115_1$-$115_4$. In instances that the PoE module 118 in PD mode, the PoE module may draw supply power via the power rails $115_1$-$115_4$. Additionally, the PoE module 118 may regulate, condition, and/or otherwise manage or control the supply power provided and/or drawn via the power rails $115_1$-$115_4$. In this regard, for a PSE mode of operation, the PoE module 118 may provide supply power over one or more of the twisted pairs 204a-204d, and for a PD mode of operation, the PoE module 118 may draw power over one or more of the twisted pairs 204a-204d. In this regard, power may be sourced via one or more of the twisted pairs 204a-204d while in PSE mode, and power may be received via the same one or more of the twisted pairs 204a-204d while in PD mode. Furthermore, the amount of power delivered may be controlled by, for example, controlling the voltages on the rails $115_1$-$115_4$, controlling current limits for one or more of the rails $115_1$-$115_4$, and/or controlling the number of twisted pairs via which power is supplied.

The embodiment of the invention depicted in FIG. 2A may be suited for, for example, ⅒GBASE-T Ethernet, where the PHY 116 communicates over all four of the twisted pairs 204a-204d. In this regard, each power rail may be coupled to a center tap of one of the transformers 202a-202d. Accordingly, in instances that the connector 112 and the PD do not share a common potential, e.g., they do not share a common "ground," then up to two of the twisted pairs 204a-204d may carry a forward current and two of the twisted pairs 204a-204d may carry a return current. For example, when the PoE module 118 is operating as a PSE, the power rail $115_1$ may be set to a voltage V1 and power rail $115_2$ may be set to a voltage V2, resulting in the twisted pair 204a carrying forward current proportional to V1 minus V2, and twisted pair 204b may carry return current proportional to V1 minus V2. However, in instances that the PoE module 118 and the PD are tied to a common potential or "ground," each of the twisted pairs 204a-204d may carry a forward current and the return current may be carried via the common ground. For example, the ground on the connector 112 may be conductively tied to the ground on the PD via the shielding 132, and the shielding 132, may carry the return current.

In some embodiments of the invention, the PoE module 118 may be operable to perform signaling functions by modulating or otherwise controlling a voltage and/or current on the power rails $115_1$-$115_4$. For example, when operating as a PSE, the PoE module 118 may be operable to vary a voltage on one or more of the power rails $115_1$-$115_4$ to communicate with a link partner. Similarly, when operating as a PD, the PoE module 118 may be operable to vary a load on one or more of the rails $115_1$-$115_4$. Similarly, the PoE module 118 may be operable to detect and/or decode modulation and/or other variations of the current and/or voltage on the power rails $115_1$-$115_4$. In this manner, the PoE module 118 may be operable to communicate with a PoE module 118 in the link partner. Because the power rails $115_1$-$115_4$ are coupled to a center tap of the transformers 202a-202d, such modulation or variation of the power rails $115_1$-$115_4$ will be common to both wires of a twisted pair and thus may have little or no impact to the differential signaling on the twisted pairs 204a-204d.

By controlling voltages output onto the rails $115_1$-$115_4$, the PoE module 118 may configure the polarity of the supply voltage and current. For example, V1 being set to a positive voltage and V2 may be set to ground or V1 may be set to ground and V2 may be set to a positive voltage. The polarity that the PoE module 118 outputs may, for example, be controlled by the host subsystem via the signals 105. The polarity that the PoE module 118 outputs may, for example, be controlled based on characteristics, such as a mechanical keying or value of a sense pin, of the cable 133. The polarity that the PoE module 118 outputs may, for example, be controlled based on signaling to and/or from a link partner coupled to the other end of the cable 133.

In an exemplary embodiment of the invention, the PoE module 118 may be operable to provide supply power via one or more the twisted pairs 204a-204d and concurrently receive power via one or more of the twisted pairs 204a-204d. For example, supply power may be drawn via twisted pairs 204a and 204b and concurrently be provided via twisted pairs 204c and 204d.

Figure 2B:
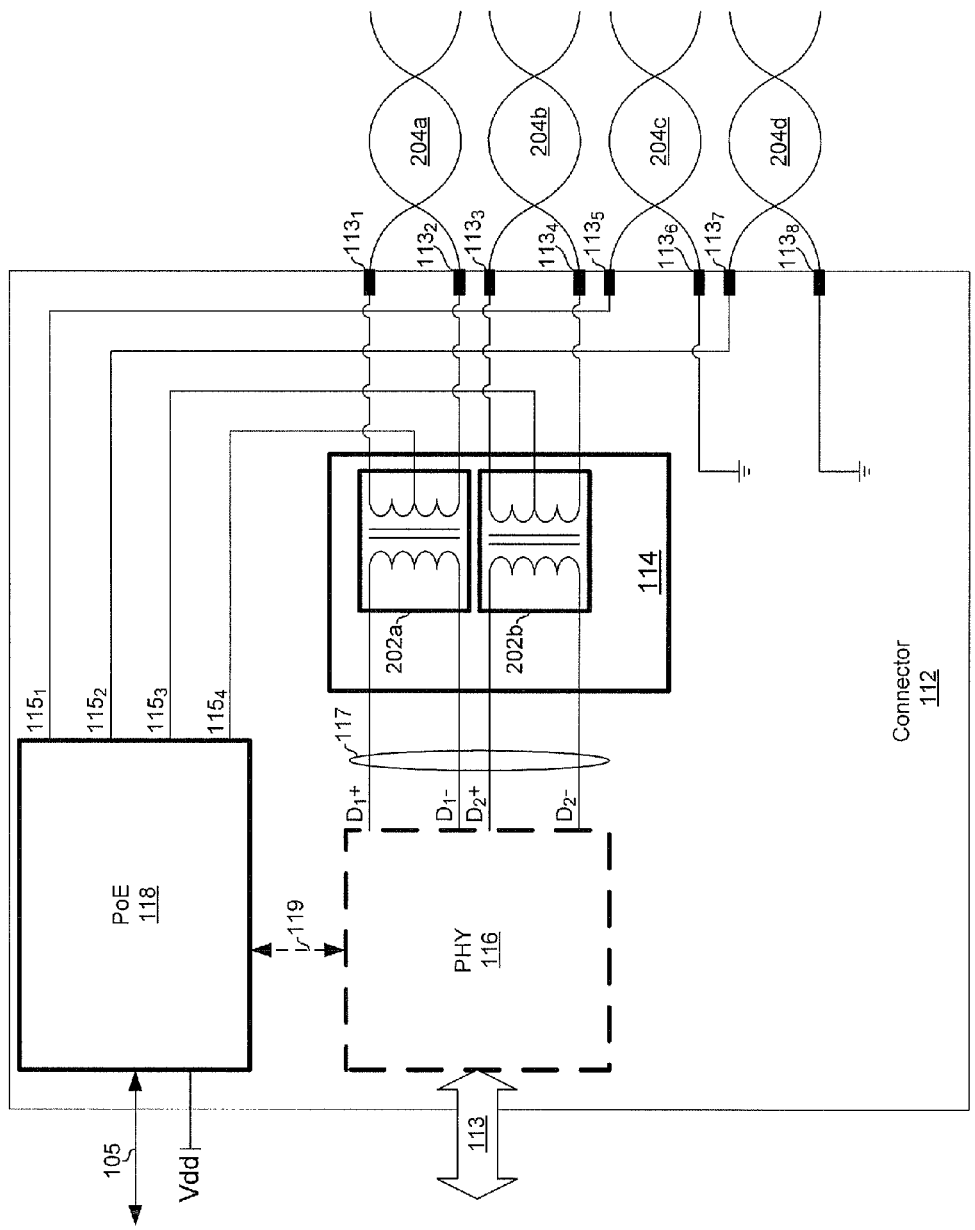
FIG. 2B is a block diagram illustrating an exemplary connector with integrated PoE functionality, in accordance with an embodiment of the invention.

FIG. 2B is a block diagram illustrating an exemplary connector with integrated PoE functionality, in accordance with an embodiment of the invention. The embodiment of the invention depicted in FIG. 2A may be suited, for example, for ⅒GBASE-T Ethernet, where the PHY 116 communicates over the twisted pairs 204a and 204b but not twisted pairs 204c and 204d. In this regard, power rails $115_1$ and $115_2$ may be coupled to a center tap of transformers 202a and 202b, respectively, and current may be carried on twisted pairs 204a and 204b and/or the shield 132, as described with respect to FIG. 2A. For each of the twisted pairs 204c and 204d, on the other hand, one wire of the pair may carry forward current and the other wire of the pair may carry return current since there is no other signal on the twisted pair that will be disturbed by the supply current. In this regard, although pins $113_6$ and $113_8$ are depicted as being connected to ground, either of both of pins $113_6$ and $113_8$ may be connected to one of the power rails $115_1$-$115_4$ or additional power rails (e.g. $115_5$ and $115_6$) not depicted in FIG. 2B.

Figure 3A:
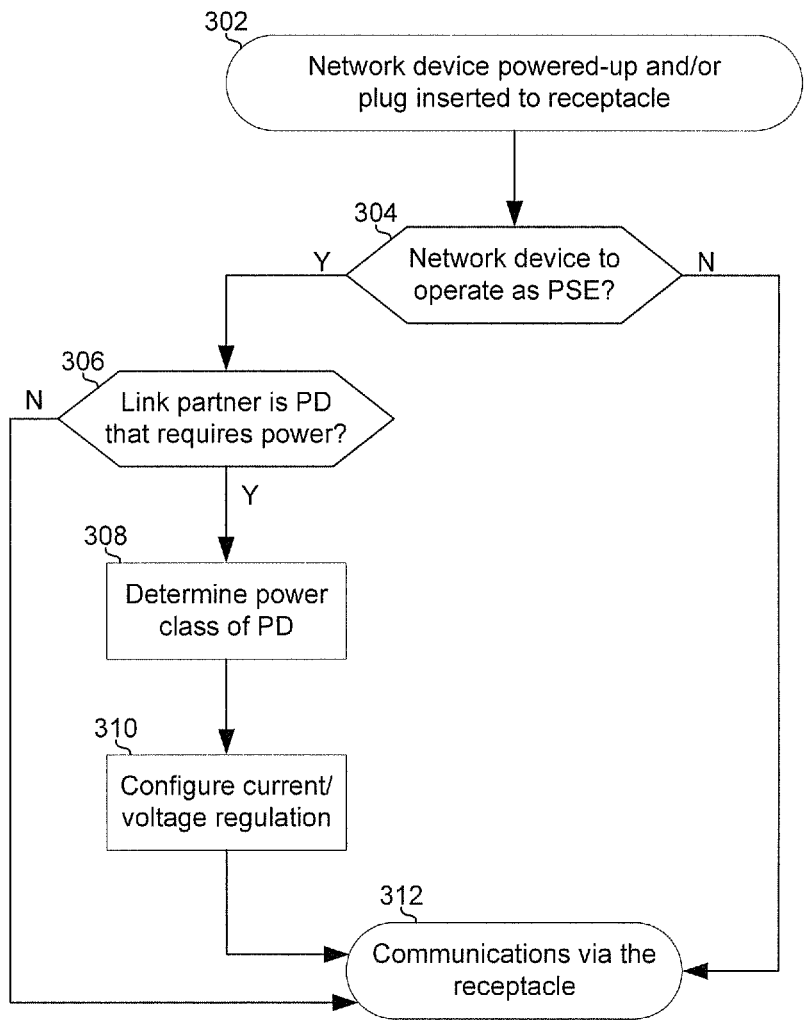
FIG. 3A is a flow chart illustrating exemplary steps for operation of a power supplying equipment (PSE) comprising a connector with integrated PoE functionality, in accordance with an embodiment of the invention.

FIG. 3A is a flow chart illustrating exemplary steps for operation of a PSE comprising a connector with integrated PoE functionality, in accordance with an embodiment of the invention. Referring to FIG. 3A, the exemplary steps may begin with step 302 when a network device 102 comprising the connector 112 is powered-up, when the connector 120 of the cable 133 is inserted into the connector 112, and/or when a state and/or mode of operation in the device 102 and/or a link partner changes. Subsequent to step 302, the exemplary steps may advance to step 304.

In step 304, it may be determined whether the network device and/or connector 112 is to operate as a PSE or a PD. This determination may be based on, for example, a configuration of the device 102, communications with a link partner, a load present on one or more wires of the cable 133, and/or based on one or more voltages present on one or more wires of the cable 133. The determination may also be based on a shape or other mechanical characteristic of the connector 120, presence of the shielding 132, and/or on the number of twisted pairs in the cable 133. In instances that the device 102 is to operate as a PD, the exemplary steps may advance to step 312.

In step 312, communications via the connector may begin, continue, and/or resume. For example, if step 302 comprised the device 102 being powered-up and/or the connector 120 being mated with the connector 112, then in step 312 the network device 312 may enter auto-negotiation. However, in various embodiments of the invention, one or more of steps 304-310, 314, and 316 may occur in parallel with and/or as part of auto-negotiation.

Returning to step 304, in instances that the device is to operate as a PSE, the exemplary steps may advance to step 306. In step 306, it may be determined whether a link partner connected to the opposite end of the cable 133 is a PD and, if so, whether the PD requires supply power from the connector 112. In instances that the link partner does not request or require supply power from the device 102, the exemplary steps may advance to previously discussed step 312.

Returning to step 306, in instances that the link partner is to be powered via the connector 112, the exemplary steps may advance to step 308. In step 308, the PoE module 118 may determine the supply power class of the link partner. That is, the PoE module 118 may determine how much power the PD desires and/or requires and whether or not the PoE module 108 can support such supply power requirements. This determination may be via passive indication such as a sense resistance and/or via active indications such as an exchange of signals. Subsequent to step 308, the exemplary steps may advance to step 310.

In step 310, the PoE module 118 may be configured based on the supply power desired and/or required by the link partner. For example, in instances that the PoE module 118 cannot support the supply power requirements of the link partner, it may output an indication to the link partner and/or to the networking subsystem 106 and/or the host subsystem 104. In this manner, the host subsystem 104, the link partner, and/or users thereof may be alerted to the condition. In instances that the supply power requirements of the link partner can be supported, the PoE module 118 may be configured to supply the appropriate voltage and/or current. Subsequent to step 310, the exemplary steps may advance to step 312.

Figure 3B:
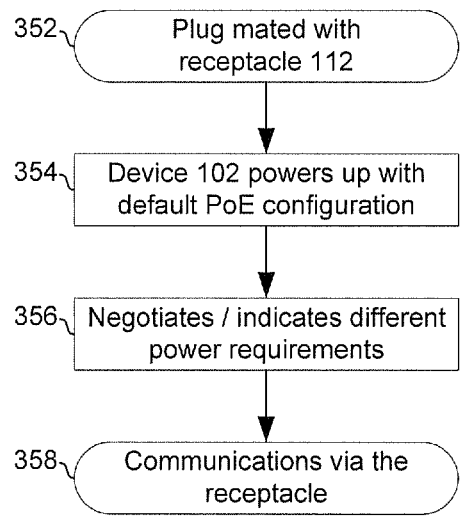
FIG. 3B is a flow chart illustrating exemplary steps for operation of a powered device (PD) comprising a connector with integrated PoE functionality, in accordance with an embodiment of the invention.

FIG. 3B is a flow chart illustrating exemplary steps for operation of a powered device (PD) comprising a connector with integrated PoE functionality, in accordance with an embodiment of the invention. Referring to FIG. 3B, the exemplary steps may begin with step 352 when a connector 120 of cable 133 is mated with the connector 112 of the network device 102. In step 354, the PoE module 118 may draw supply power from the link partner coupled to the opposite end of the cable 133, condition or regulate the supply power, and deliver the supply power to the networking subsystem 106 and/or the host subsystem 104. In this regard, the PoE module 118 may power up in a default configuration associated with a particular amount of supply power drawn from the link partner. Subsequent to step 354, the exemplary steps may advance to step 356. In step 356, the PoE module 118 may be configured to alter the amount of supply power drawn from the link partner. For example, the networking subsystem 106 and/or the host subsystem 104 may be in an energy-saving mode and the PoE module 118 may be configured to indicate that it requires less supply power. Conversely, networking subsystem 106 and/or the host subsystem 104 may be in a high-performance mode and the PoE module 118 may be configured to indicate that it requires more supply power. Subsequent to step 356, the exemplary steps may advance to step 358. In step 356, communications via the connector 112 may begin. However, in various embodiments of the invention, one or more of steps 354 and 356 may occur in parallel with communications beginning over the cable 133.

Figure 4:
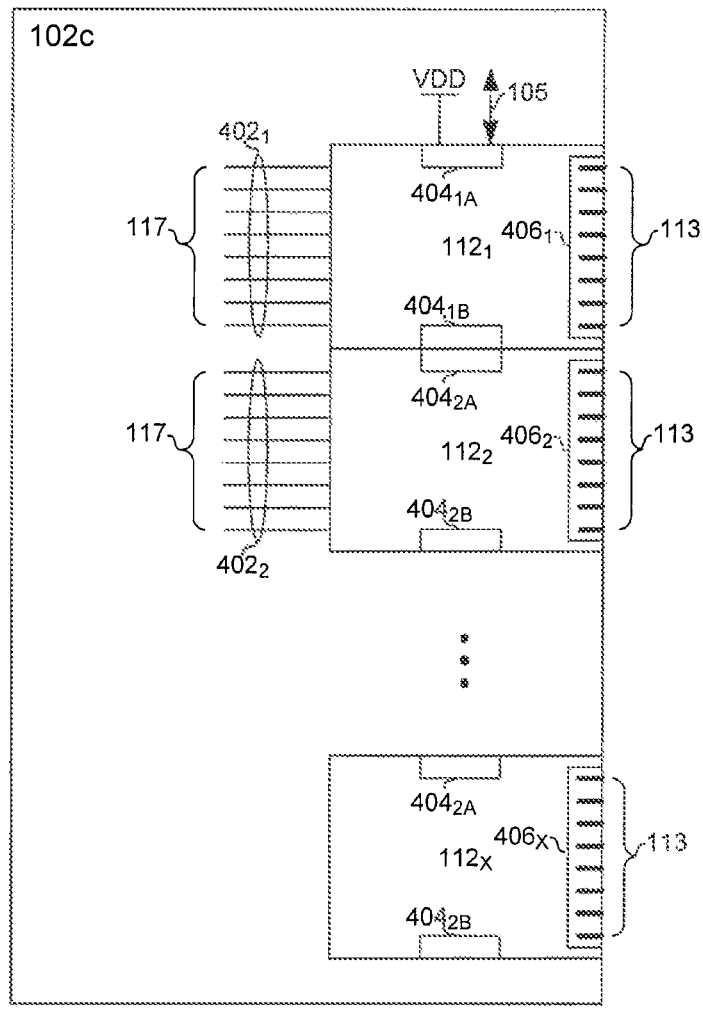
FIG. 4 is a block diagram illustrating coupling of a plurality of connectors, in accordance with an embodiment of the invention.

FIG. 4 depicts a block diagram illustrating coupling of a plurality of connectors, in accordance with an embodiment of the invention. Referring to FIG. 4, there is shown a networking device 102c comprising a plurality, X, of connectors 112, where X is an integer greater than 1. The networking device 102c may be substantially similar to the networking devices 102a and 102b. Each of the connectors $112_1$-$112_x$, may comprise a first interface 402 for coupling, via a printed circuit board, with the host subsystem 104 and/or the networking subsystem 106, interfaces $404_A$ and $404_B$ for coupling with other connectors 112, and an interface 406 for coupling with a cable. In this regard, the connectors 112 may be modular in that connectors 112 may be added or removed with little or no changes and/or reconfiguration of the networking subsystem 106 and/or host subsystem 104. For example, the connectors 112 may be "plug and play" upon addition of a connector 112, the connector may be enumerated with a unique address and controlled by the host subsystem 104 via the signals 105 and/or one of the connectors 112 may assume the role of master and may control the remaining connectors which may assume the role of slaves.

Each of the interfaces 402, 404, and 406 of a connector 112 may comprise one or more contacts which may comprise, for example, pins and/or solder bumps. The interfaces 404A and 404B may enable the modularity of the connectors 112. In this regard, the connector $112_1$ may be coupled to a power rail (VDD), the signals 105, and the bus 117 via the interface $402_1$ and may be coupled to connector $112_2$ via the interface $404_{1B}$ and the interface $404_{2A}$. Similarly, a connector $112_3$, if present, may be coupled to the connector $112_2$ via interfaces $404_{2B}$ and $404_{3A}$, a connector $112_4$ to the connector $112_3$, and so forth, up to connector $112_x$. In this manner, the connectors $112_1$-$112_x$, may be coupled, or "ganged," together in a daisy-chain fashion.

One advantage of coupling connectors together in this way is that board real estate beneath the connectors may not be needed for traces that run to the connectors and may thus be used for routing other traces. In combination with the integration of components such as the magnetics 114, the PHY 116, and the PoE module 118, such a modularized connector system may free up a large amount of board real-estate near where the connectors are mounted.

In various embodiments of the invention, only a subset of the connectors $112_1$-$112_x$ may comprise a PoE module 118 and a PoE module 118 may manage power supplied and/or drawn via a plurality of the connectors $112_1$-$112_x$. For example, as shown in FIG. 4, the connector $112_1$ may comprise a PoE module 118, while the remaining connectors $112_2$-$112_x$ may not. Accordingly, the PoE module 118 in the connector $112_1$ may manage supply power drawn and/or provided via all of the connectors $112_1$-$112_x$. In this manner, the PoE module 118 may allocate power among the connectors $112_1$-$112_x$ based on, for example, supply power needs of each connector 112, priority or importance of providing power to the various connectors 112, characteristics of the connectors 112 and/or the cable assemblies to which they are connected, measured power consumption of the various connectors 112, and/or various other parameters. Additionally, the PoE module 118 may be operable to draw supply power via a first subset of the connectors $112_1$-$112x$ and distribute that supply power via a second subset of the connectors $112_1$-$112_x$.

In various embodiments of the invention, one or more "full featured" connectors, such as the connectors $112_1$ and $112_2$ in FIG. 4, may be operable to support both data and supply power, and one or more "power" or "charging" connectors, such as connector $112_x$ in FIG. 4, may be operable to provides and/or receives supply power, but not support data communications.

Aspects of a method and system for an Ethernet connector with integrated PoE functionality are provided. In an exemplary embodiment of the invention, one or more circuits and/or processors, such as PoE module 118, NVM 150, LEDs 152, magnetics 114, and PHY 116, that reside within and/or on a connector 112 may be operable to manage a supply power that is delivered over a cable 133 based on characteristics of the connector 112 and/or characteristics of the cable 133. The cable 133 may carry the supply power while concurrently carrying data communications. The one or more circuits and/or processors may be operable to source and sink the supply power. The one or more circuits and/or processors may be operable to control which one or more conductors 204 of the cable are utilized for conveying the supply power. Exemplary characteristics of the connector 112 may comprise which pins are present on and/or within the connector 112 and/or a configuration of one or more circuits within and/or on the connector 112. Exemplary characteristics of the cable 133 comprise a length of the cable, a diameter of one or more conductors 204 of the cable, and whether the cable 133 is shielded.

The connector 112 may comprise one or more first interfaces 406 that enable electrically coupling the connector to the cable 133, one or more second interfaces 402 that enable electrically coupling the connector to a device 102 that the connector 112 is mounted within or on, and one or more third interfaces 404A or 404B that enable electrically coupling the connector 112 to a second connector 112 that is mounted on or within the device 102. The one or more circuits and/or processors may be operable to manage supply power provided and/or drawn via the second connector 112. The one or more circuits and/or processors may be controlled via a fourth interface 404A or 404B. The one or more circuits and/or processors may be operable to manage the supply power utilizing layer two and/or 2-event power classification.

The one or more circuits and/or processors may enable the supply power and the data communications to be carried concurrently on the same one or more conductors 204 of the cable 133. The one or more circuits and/or processors may be operable to communicate information to a link partner coupled to another end of the cable 133 by varying a load and/or a voltage on one or more conductors 204 of the cable 133. The one or more circuits and/or processors may be operable to detect variations in the supply power and recover information conveyed via the variations. The one or more circuits and/or processors may be operable to measure an amount of supply power provided and/or drawn via the connector 112 and perform the managing based on the measurement. The one or more circuits and/or processors may be operable to process packets to terminate one or more network management protocols.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a connector with integrated power over Ethernet functionality.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
 performing by a plurality of connectors, each connector of the plurality of connectors having a circuit therein or thereon and interfacing a respective cable of a plurality of cables to a networking enabled device:
 conducting an electrical signal between a first connector of the plurality of connectors and a directly adjacent second connector of the plurality of connectors through a direct physical contact between the first and the second connectors;
 managing a supply power that is delivered over a first cable of the plurality of cables based on characteristics of the first connector or characteristics of the first cable, wherein:

the first cable carries the supply power while concurrently carrying data communications;

the circuit of each connector of the plurality of connectors is configured to source and sink the supply power;

the circuit of each connector of the plurality of connectors is configured to control which one or more conductors of the respective cable is utilized for conveying the supply power; and the circuit of each connector of the plurality of connectors is configured to perform physical layer (PHY) functionality; and managing, by the circuit of the first connector, supply power delivered via the second connector.

2. The method according to claim 1, wherein the characteristics of the first connector comprise:

a quantity of pins within and/or on the first connector;

a type of a pin of the quantity of pins within and/or on the first connector; or a configuration of the circuit within or on the first connector.

3. The method according to claim 1, wherein the characteristics of the first cable comprises:

a length of the first cable;

a diameter of a conductor of the first cable; or whether the first cable is shielded.

4. The method according to claim 1, further comprising managing, by the circuit of the first connector, the supply power utilizing layer two and/or 2-event power classification.

5. The method according to claim 1, wherein the circuit of the first connector enables the supply power and the data communications to be carried concurrently on the one or more conductors of the first cable.

6. The method according to claim 1, further comprising communicating, by the circuit of the first connector, information to a link partner coupled to another end of the first cable by varying a load or a voltage on a conductor of the first cable.

7. The method according to claim 1, further comprising detecting, by the circuit of the first connector, variations in the supply power and recovering information conveyed via the variations.

8. The method according to claim 1, further comprising measuring, by the circuit of the first connector, an amount of the supply power delivered via the first connector and performing the managing based on a result of the measuring.

9. The method according to claim 1, further comprising processing, by the circuit of the first connector, packets to terminate a network management protocol.

10. The method according to claim 1, wherein the circuit of the first connector is configured to source the supply power based on a determination that the networking enabled device is configured as a power supplying equipment, and wherein the circuit of the first connector is configured to sink the supply power based on a determination that the networking enabled device is configured as a powered device.

11. A system for networking, the system comprising:

a plurality of connectors, each connector having a circuit residing therein or thereon and being configured to interface a respective cable of a corresponding plurality of cables to a networking enabled device, the circuit of each connector of the plurality of connectors being configured to:

conduct an electrical signal between a first connector of the plurality of connectors and a directly adjacent second connector of the plurality of connectors through a direct physical contact between the first and the second connectors;

manage, by the circuit of the first connector, supply power delivered via the second connector;

manage a supply power delivered over a first cable of the plurality of cables based on a characteristic of the first connector or a characteristic of the first cable, wherein:

the first cable is configured to carry the supply power while concurrently carrying data communications;

the circuit of the first connector is configured to source and sink the supply power;

the circuit of the first connector is configured to control which one or more conductors of the first cable are utilized for conveying the supply power; and the circuit of each of the plurality of connectors is configured to perform physical layer (PHY) functionality.

12. The system according to claim 11, wherein the characteristics of the first connector comprise:

a quantity of pins within or on the first connector;

a type of a pin within or on the first connector; or a configuration of a circuit within or on the first connector.

13. The system according to claim 11, wherein the characteristics of the first cable comprise:

a length of the first cable;

a diameter of a conductor of the first cable; or whether the first cable is shielded.

14. The system according to claim 11, wherein the circuit of the first connector is configured to manage the supply power utilizing layer two and/or 2-event power classification.

15. The system according to claim 11, wherein the circuit of the first connector is configured to enable the supply power and the data communications to be carried concurrently on the one or more conductors of the first cable.

16. The system according to claim 11, wherein the circuit of the first connector is configured to communicate information to a link partner coupled to another end of the first cable by varying a load or a voltage a conductor of the first cable.

17. The system according to claim 11, wherein the circuit of the first connector is configured to detect variations in the supply power and recover information conveyed via the variations.

18. The system according to claim 11, wherein the circuit of the first connector is configured to measure an amount of the supply power provided or drawn via the first connector and to perform the managing based on said measuring.

19. The system according to claim 11, wherein the circuit of the first connector is configured to process packets to terminate a network management protocol.

20. The system according to claim 11, wherein the circuit of the first connector is configured to source the supply power based on a determination that the networking enabled device is configured as a power supplying equipment, and wherein the circuit of the first connector is configured to sink the supply power based on a determination that the networking enabled device is configured as a powered device.

* * * * *

UNITED STATES PATENT AND TRADEMARK OFFICE
CERTIFICATE OF CORRECTION

| | | |
|---|---|---|
| PATENT NO. | : 8,935,542 B2 | |
| APPLICATION NO. | : 12/752065 | |
| DATED | : January 13, 2015 | |
| INVENTOR(S) | : Diab et al. | |

It is certified that error appears in the above-identified patent and that said Letters Patent is hereby corrected as shown below:

In the Claims,

Column 18, Line 43, please replace "a voltage a conductor" with --a voltage on a conductor--.

Signed and Sealed this
Twenty-third Day of June, 2015

Michelle K. Lee
*Director of the United States Patent and Trademark Office*